United States Patent [19]
Klein

[11] Patent Number: 5,921,553
[45] Date of Patent: Jul. 13, 1999

[54] SEALING RING ASSEMBLY FOR A SINGLE SEALING RING PISTON

[76] Inventor: Thomas G. Klein, 1207 N. Miller Rd., Tempe, Ariz. 85281

[21] Appl. No.: 08/926,076

[22] Filed: Sep. 2, 1997

[51] Int. Cl.⁶ ........................................... F16J 9/20
[52] U.S. Cl. ........................... 277/492; 277/435; 277/491
[58] Field of Search .................................... 277/434, 435, 277/459, 460, 489, 491, 492, 496, 497, 905, FOR 121, FOR 233

[56] References Cited

U.S. PATENT DOCUMENTS

| | | | |
|---|---|---|---|
| 1,086,948 | 2/1914 | Smith | 277/491 X |
| 1,179,682 | 4/1916 | Trump | 277/492 |
| 1,320,307 | 10/1919 | Anderson | 277/492 X |
| 1,407,714 | 2/1922 | Whitcomb | 277/492 X |
| 1,477,368 | 12/1923 | Kottusch | 277/434 |
| 2,812,196 | 11/1957 | Atkinson | 277/497 X |
| 3,521,893 | 7/1970 | Josephson | 277/492 X |

OTHER PUBLICATIONS

Double Seal Ring Company, "Catalog Double Seal Piston Rings", Fort Worth, Texas, pp. 3, 10 & back cover, 1953.

*Primary Examiner*—Lynne A. Reichard
*Assistant Examiner*—Greg Binda
*Attorney, Agent, or Firm*—M. Reid Russell

[57] ABSTRACT

A sealing ring assembly for installation in a single sealing ring groove of a piston that is for use in an internal combustion engine, hydraulic cylinder piston, or the like, and replaces the top and second ring seals as are presently utilized, which sealing ring assembly is for curtailing leakage between the piston outer surface and surface of a cylinder containing the piston. The sealing ring assembly consists of a first, primary or main ring that is for fitting in a piston sealing ring groove and is cut back along top and bottom surfaces to provide slots that are each receive a flat rail fitted therein, with the assembly to be contained within the sealing ring groove. The sealing ring assembly can be manufactured in various widths from one quarter (¼) inch to one (1) millimeter, and the first, primary or main ring preferably has an end gap cut formed at a ninety (90) degree angle thereacross, and the rails preferably each have an end gap cut formed at a forty-five (45) degree angle thereacross.

7 Claims, 3 Drawing Sheets

SEALING RING ASSEMBLY FOR A SINGLE SEALING RING PISTON

BACKGROUND OF THE INVENTION

1. Field of the Invention

The present invention relates to piston rings, and in particular to rings that can be fitted into piston ring grooves during piston manufacture or can be utilized as replacement rings.

2. Prior Art

Currently, in conventional internal combustion engine and hydraulic pump applications, each piston of such engine or pump generally includes a top ring and a second ring that function as sealing rings and further includes an oil control ring spaced from the top and second rings towards the piston bottom end. During engine or pump operations, the sealing rings engage and seal against a cylinder wall to maintain cylinder pressure integrity and, as they are moved up and down in that cylinder, they each create a frictional horsepower power loss. For example, an engine that is predicted to nine hundred (900) horsepower will show approximately seven hundred (700) horsepower, true, as measured on a dynamometer. This is a difference of two hundred (200) horsepower between the theoretical and actually generated horsepower and is primarily attributable to the friction loss of contact of the sealing rings with the cylinder wall. Where the top and second rings must fit tightly against the cylinder wall, the oil control ring is comparatively loose fitting as it is intended only to apply a coating of oil onto the cylinder wall. Therefore, it is apparently the case that the top and second sealing rings are responsible for most of the friction loss. Clearly, therefore, an elimination of one of the sealing rings should provide a marked reduction in friction losses. The present invention provides a ring and seal combination assembly whereby, with a single sealing ring assembly only, cylinder head pressures will be properly contained during engine operation, with the utilization of a single sealing ring only providing a significant improvement in engine efficiency over earlier pairs of seal ring arrangements, such as those that utilize the described top and second sealing rings.

SUMMARY OF THE INVENTION

It is a principal object of the present invention in a piston sealing ring assembly to provide a combination of a primary, first or main piston ring as a replacement for top and second piston sealing rings as are commonly in use. Which primary piston ring is arranged for fitting between upper and lower rails or sealing rings.

Another object of the present invention in a piston sealing ring assembly is to provide, with a single piston ring, for replacement a pair of top and second sealing rings with a single piston ring, as are currently in use with the single piston ring to provide an equivalent function to the pair of sealing rings as are commonly used to prohibit or substantially limit a loss of pressure between the piston and engine cylinder wall.

Still another object of the present invention in a piston sealing ring assembly is to provide an assembly for conveniently fitting in a ring groove of an automotive engine piston, hydraulic cylinder piston, or the like, during piston manufacture or can be easily installed as a replacement item to an appropriately configured piston.

The present invention is in a single piston ring assembly that is for arrangement as a top, primary, first or main sealing ring for a piston, that can be a piston of an internal combustion engine, hydraulic cylinder, or the like, and replaces a pair of spaced top and second sealing rings as are currently in use that are for fitting in piston ring grooves of currently available pistons of engines, pumps, and like devices. The piston sealing ring assembly of the invention includes a top, primary, first or main sealing ring that is back cut along its top and bottom surfaces to receive, in each back cut, respectively, upper and lower rails that are fitted therein. The top, primary, first or main sealing ring outer edge surface is for engaging and sealing against a cylinder wall, with the sealing ring positioned between the upper and lower rails that are positioned to eliminate an alignment of end gap cut therebetween and are arranged to accommodate top, primary, first or main sealing ring expansion as the sealing ring temperature is elevated during engine operations. The upper and lower rails each preferably include an end gap cut that is formed at approximately a forty five (45) degree angle thereacross, with the top, primary, first or main sealing ring end gap cut preferably formed at approximately a ninety (90) degree angle thereacross. Whereby, should in practice, the three end gap cuts align, the opposing angularity of the upper and lower rails end gap cuts would preclude leakage therethrough.

A conventional oil control ring package is preferably included with the sealing ring assembly of the invention to provide for wiping a layer of lubricating oil onto a cylinder wall as the piston is moved up and down.

BRIEF DESCRIPTION OF THE DRAWINGS

These and other objects and features of the present invention will become more apparent from the following description in which the invention is described in detail in conjunction with the accompanying drawings.

DETAILED DESCRIPTION

Figure 1:
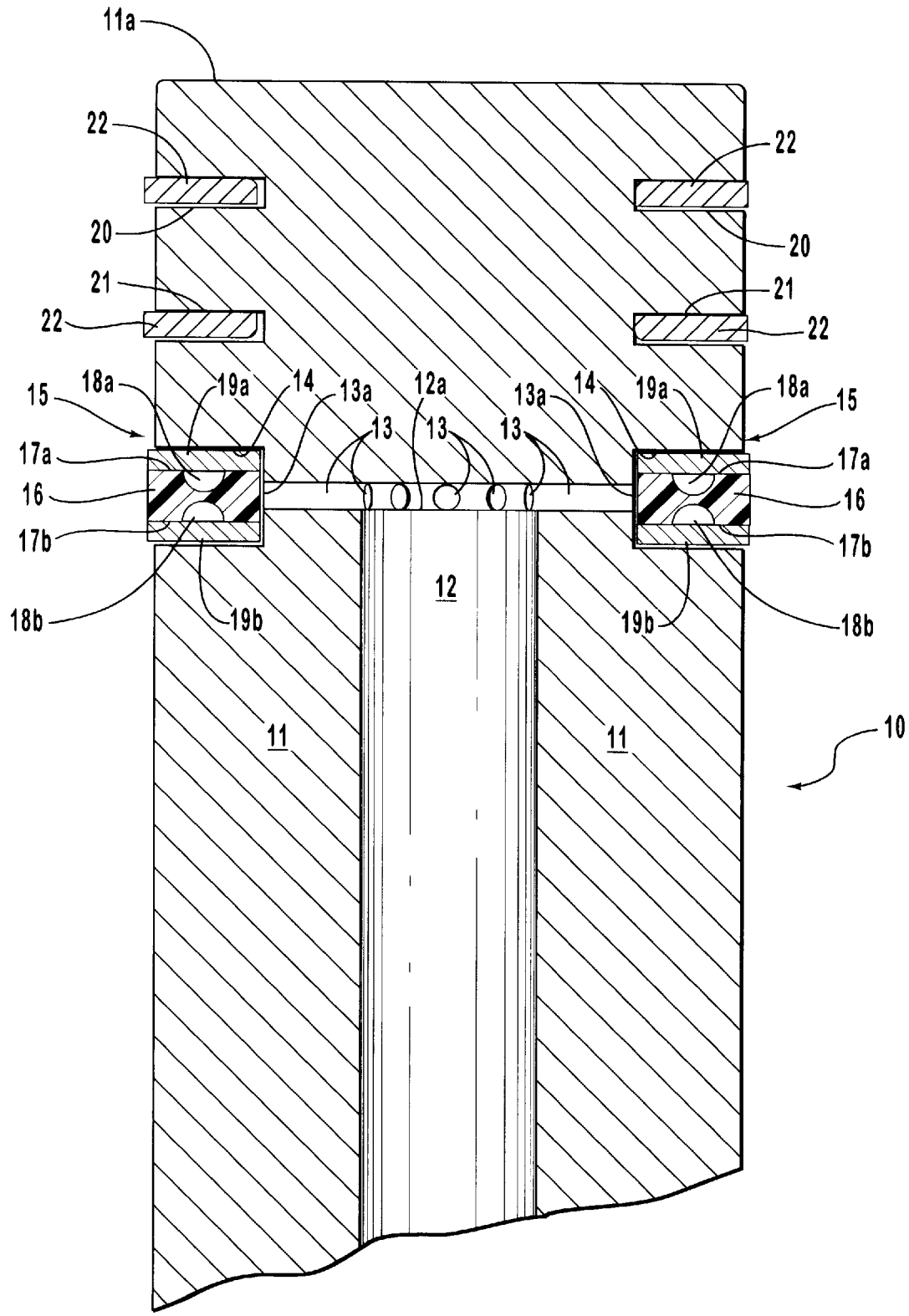
FIG. 1 is a side elevation longitudinal sectional view of a top or upper portion of a piston that is identified as Prior Art and is shown as including a pair of conventional top and second sealing rings fitted into piston ring grooves and shows the piston as including a conventional oil control ring package.

FIG. 1 is identified as Prior Art that is shown to include a conventional piston and ring arrangement as is now in common use in automotive engines, hydraulic pumps and motors, and the like. Therein a conventional piston 10 is shown as a solid cylinder 11 that includes a straight center longitudinal oil passage 12 that, at a top end 12a thereof, is crossed by radial oil ports 13 whose outer ends 13a open into an oil control ring groove 14 formed in the piston outer cylindrical surface. An oil control ring 15 is shown fitted into the oil control ring groove 14 that, it should be understood, is a standard piston component and is also preferred for use with the present invention. Shown in both FIGS. 1 and 2, the oil control ring 15 includes an oiling ring 16, that is shown as formed from a plastic, or plastic like material, but may be formed of a metal, or the like, within the scope of this disclosure. The oiling ring 16 includes opposing top and bottom grooves, 18a and 18b, respectively, that are formed in the ring top and bottom surfaces 17a and 17b, respectively, to capture oil functioning as reservoirs. During piston up and down travel, oil is passed from the oil ports 13, with that oil flowing into the grooves 18a and 18b and then onto the wall of a cylinder wherein the piston is fitted. Flat upper and lower containment rings 19a and 19b, respectively, are provided for fitting into the oil control ring groove 14, sandwiching the oiling ring 16 therebetween, that are to contain so as to maintain the individual oiling ring shape during its movement along the cylinder wall.

Shown also in the Prior Art device of FIG. 1 are a pair of top and second ring grooves 20 and 21, respectively, that are shown to each contain a conventional a metal sealing ring 22. In practice the sealing rings 22 are generally interchangeable, but my be separately manufactured and individually identified for fitting, respectively, in either the top or second ring grooves 20 or 21. The sealing rings 22 are standard items that each include an end gap, not show, that is to allow the ring to be spread at the gap so as to allow it to be slide over the piston 11 top face 11a, and along the piston cylindrical surface, fitting into the respective top or second ring groove 20 or 21. Once fitted into the respectively top or second ring groove, the sealing ring 22 is to return to its original ring shape, closing the end gap to essentially provide a closed ring. As required, a number of like sealing rings can be stacked on top of one another in each of the top and second ring grooves 20 and 21, respectively, such that the end gaps of each ring will not align the stack, to function as the sealing ring 22.

Figure 2:
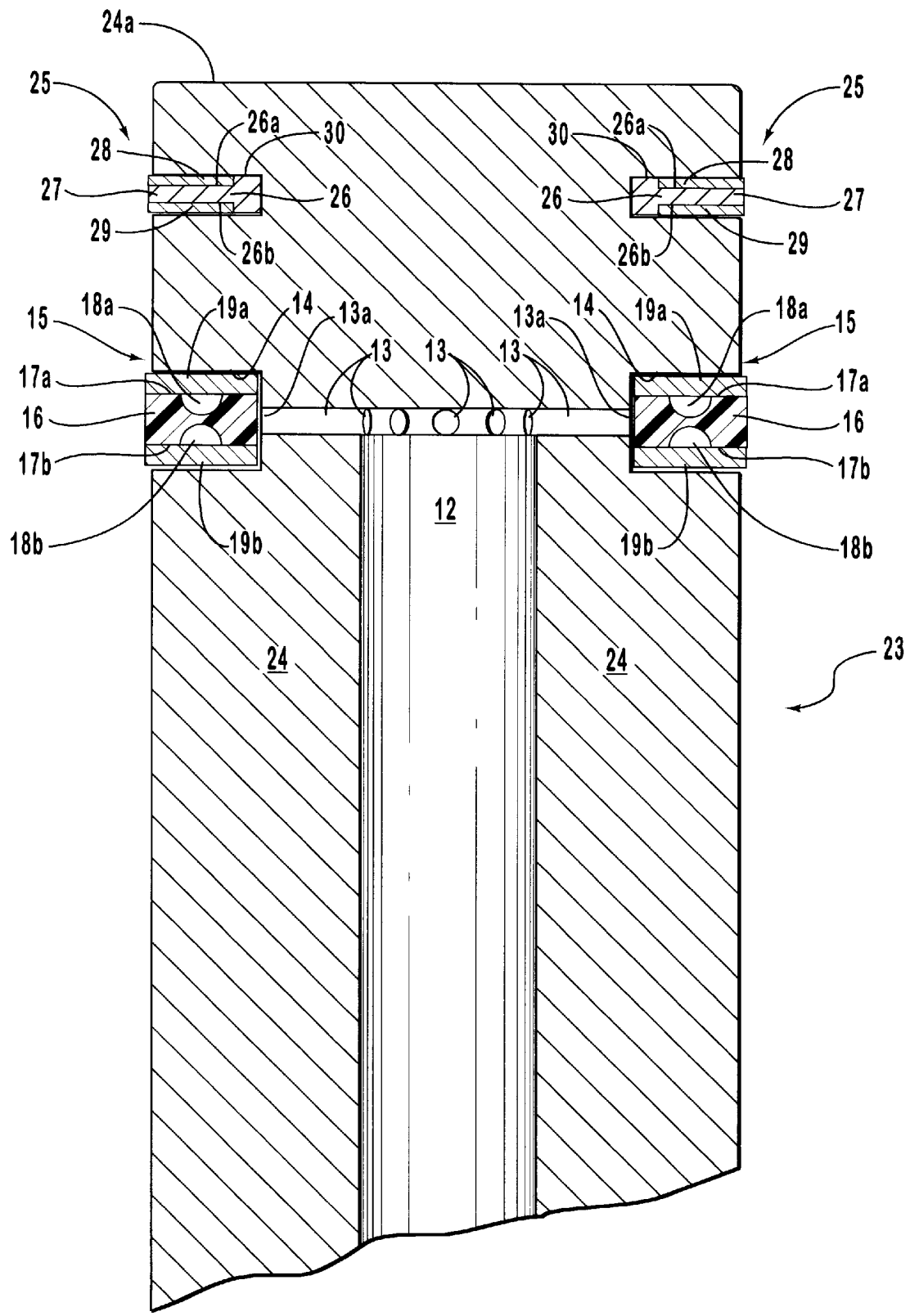
FIG. 2 is a view like that of FIG. 1 only showing the top and second sealing rings as having been replaced with a single sealing ring assembly of the invention, and showing the conventional oil control ring package of FIG. 1 included therewith.
Figure 3:
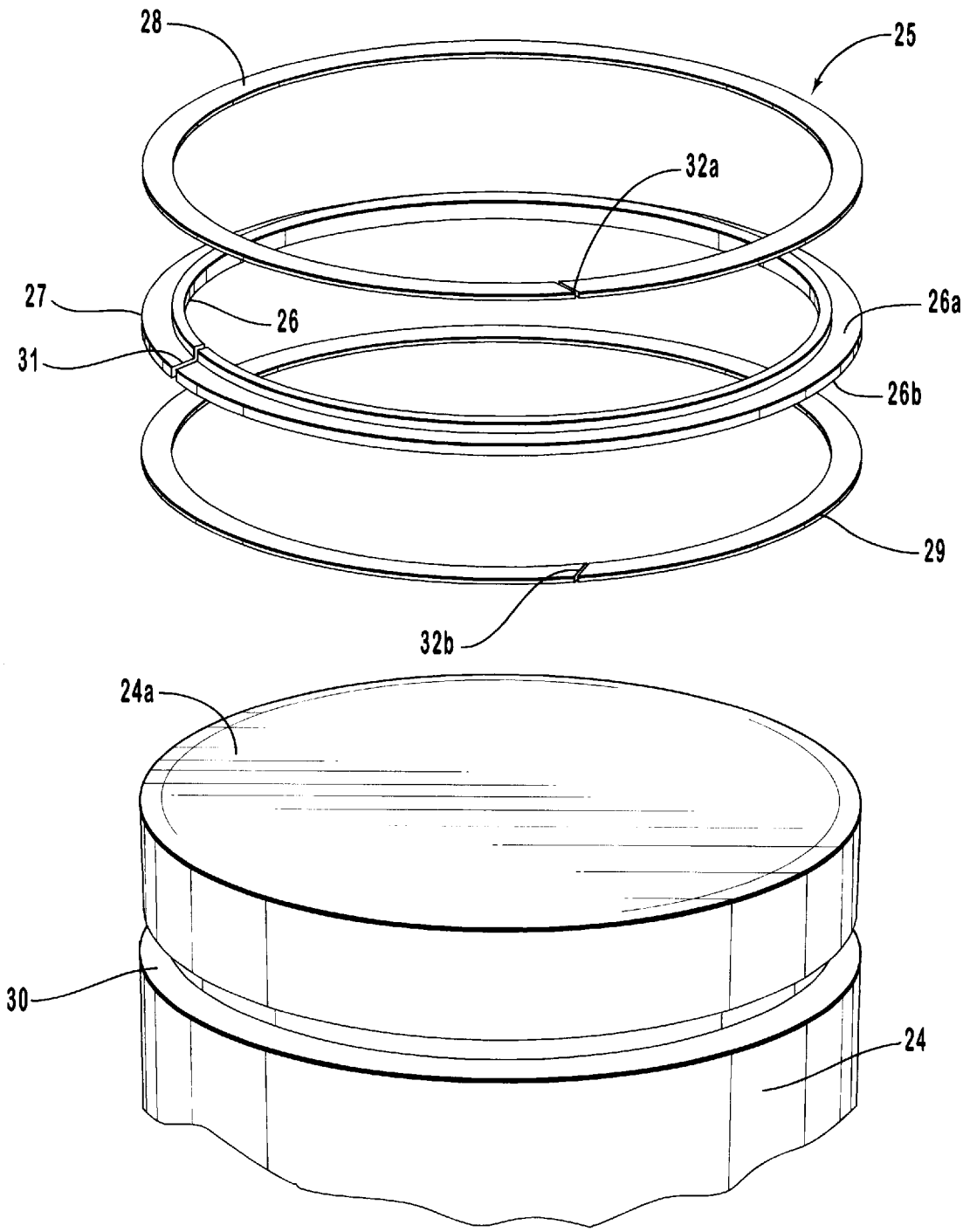
FIG. 3 is an enlarged exploded top perspective view of a top portion of the piston of FIG. 2, with the sealing ring assembly shown exploded upwardly from the piston top portion surface and showing the single sealing ring assembly separated into a main ring, between upper and lower rails and showing the main ring as having a ninety (90) degree end gap cut with the upper and lower rails shown as having forty five (45) degree end gap cuts.

Shown in FIGS. 2 and 3, the invention is in a sealing ring assembly 25, that is fitted to a piston assembly 23 that includes a cylindrical piston 24 having a center longitudinal oil passage 12 and oil ports 13 that are like those described above with respect to the piston 11 of FIG. 1 and flat top surface 24a. Shown in FIGS. 2 and 3, the sealing ring assembly includes a center first, primary or main ring 26, that has been cut back from an outer cylinder wall engaging flat end 27 to form top and bottom shelves 26a and 26b, respectively, wherein top and bottom rails 28 and 29, respectively, are fitted. The sealing ring assembly 25 is arranged to be fitted into a sealing ring assembly groove 30 that is formed in and around the cylindrical piston 24 cylindrical outer surface, with the opposing parallel surfaces of the groove 30 and shelves 26a and 26b to form channel type slots for containing the respective top and bottom rails 28 and 29, respectively. Shown in FIG. 3, for mounting the respective first, primary or main ring 26 and top and bottom rails 28 and 29, respectively, in the sealing ring assembly groove 30. The first, primary or main ring 26, preferably has a gap cut 31 formed therein at a ninety (90) degree angle across the ring, with the rails 28 and 29, respectively, each having a gap cut 32a and 32b, respectively, that is formed at a forty-five (45) degree angle across each of the rails. In practice, when installing the first, primary or main ring and the rails in the groove 30 the respective gap cuts 31, 32a and 32b are preferably off set from one another to avoid leakage of pressure across the sealing ring assembly. Though, it should be understood, even should the respective gap cuts 31, 32a and 32b align, when the respective first, primary or main ring and rails are fitted in the ring assembly groove 30, the individual gap cut openings will still be off-set to one another, insuring that minimum leaking only could occur. It should, however, be understood that the respective gap cuts 31, 32a and 32b formed in the first, primary or main ring 26 and rails 28 and 29, respectively, can be other than the angles set out above and still be within the scope of the present disclosure.

In practice, the first, primary or main ring 26 is preferably formed from metal and a steel identified as cast, forged or billet can be used for its manufacture, and the rails 28 and 29, respectively, are also preferably formed from a metal and a steel also identified as cast, forged or billet can be so used for their manufacture. The rails 28 and 29 are preferably manufactured to be interchangeable though, as required, they can be formed from different materials for use as, respectively, the top rail 28 or bottom rail 29, within the scope of this disclosure.

In practice, the sealing ring assembly 25 can be produced in various widths ranging from a one quarter inch (¼) inch width to a width of one (1) millimeter, to conveniently replace top and second sealing rings, as shown in FIG. 1 identified herein as Prior Art. In a utilization of the sealing ring assembly 25 on an internal combustion engine that would theoretically produce an output horsepower of nine hundred (900) horsepower but would have a true horsepower output, as measured on a dynamometer, of seven hundred (700) horsepower. That engine power loss of two hundred (200) horsepower will be, in large measure, attributable to the pair of sealing rings 22, as shown in FIG. 1. With the substitution of the single sealing ring assembly 25 of FIGS. 2 and 3 fitted in sealing ring assembly groove 30, it is estimated that horsepower losses for sealing the piston in the piston cylinder, will be significantly reduced. A mathematical prediction of which performance improvement is hereinafter set out as:

An average of twenty two (22) percent power loss due to frictional horsepower loss of three ring package was found. With the reduction of one ring provided by the sealing ring assembly 25, power loss was reduced to twelve (12) to fourteen (14) percent. A utilization of the invention in the sealing ring assembly 25 thereby provides an eight (8) to ten (10) percent improvement in engine efficiency.

Hereinabove has been set out a description of a preferred embodiment of the invention in a sealing ring assembly 25 and its use as a seal for an automotive engine piston, hydraulic cylinder piston, or the like, and while a preferred embodiment of the invention has been shown and described herein, it should be understood that the present invention can be varied within the scope of this disclosure without departing from the subject matter coming within the scope of the following claims, and a reasonable equivalency thereof, which claims I regard as my invention.

I claim:

1. A sealing ring assembly for fitting in a sealing ring groove of a piston comprising, a first, primary or main ring having a diameter to fit in a piston sealing ring groove, and includes a ninety (90) degree end gap cut and is cut back along top and bottom surfaces to form equal slots having a uniform width therebetween that are for receiving, respectively, top and bottom rails; and a pair of interchangeable flat rails that are each identically formed to fit, respectively, in either one of said equal slots formed in said first, primary or main ring and alongside opposing parallel surfaces of said piston sealing ring groove, forming a piston sealing ring having a uniform width along its length with each said rail having parallel opposite faces and including a like forty-five (45) degree end gap cut.

2. A sealing ring assembly as recited in claim 1, wherein the sealing ring assembly has a width from one quarter (¼) inch to one (1) millimeter.

3. A sealing ring assembly as recited in claim 1, wherein the first, primary or main ring is formed from metal.

4. A sealing ring assembly as recited in claim 3, wherein the metal used in a manufacture of the first, primary or main ring is a cast, forged or billet steel.

5. A sealing ring assembly as recited in claim 1, wherein the rails are formed from a like material.

6. A sealing ring assembly as recited in claim 5, wherein the rails are each formed from a metal.

7. A sealing ring assembly as recited in claim 6, wherein the metal used in the manufacture of the individual rails is a cast, forged or billet steel.

\* \* \* \* \*